United States Patent
Banks et al.

(10) Patent No.: US 9,554,323 B2
(45) Date of Patent: Jan. 24, 2017

(54) GENERATING SEQUENCED INSTRUCTIONS FOR CONNECTING THROUGH CAPTIVE PORTALS

(71) Applicant: Microsoft Technology Licensing, LLC, Redmond, WA (US)

(72) Inventors: Nicholas A. Banks, Duvall, WA (US); Piyush Goyal, Redmond, WA (US); Shai Guday, Redmond, WA (US); Triptpal Singh Lamba, Bothell, WA (US); David Neil MacDonald, Seattle, WA (US); Darya Mazandarany, Kirkland, WA (US); Christopher R. Rice, Redmond, WA (US); Saumaya Sharma, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 75 days.

(21) Appl. No.: 14/081,206

(22) Filed: Nov. 15, 2013

(65) Prior Publication Data

US 2015/0139082 A1    May 21, 2015

(51) Int. Cl.
H04W 48/08    (2009.01)
H04W 12/08    (2009.01)

(52) U.S. Cl.
CPC .............. *H04W 48/08* (2013.01); *H04W 12/08* (2013.01)

(58) Field of Classification Search
CPC ...... H04W 48/08; H04W 48/16; H04W 48/20; H04W 12/00; H04W 12/06; H04W 12/08
See application file for complete search history.

(56) References Cited

U.S. PATENT DOCUMENTS

2008/0186882 A1    8/2008  Scherzer et al.
2009/0313358 A1    12/2009 Shepherd et al.
(Continued)

FOREIGN PATENT DOCUMENTS

EP    1705869 B1     10/2010
WO    2013095451 A1  6/2013

OTHER PUBLICATIONS

"The Future of Hotspots: Making Wi-Fi as Secure and Easy to Use as Cellular", Retrieved at <<http://www.cisco.com/en/US/solutions/collateral/ns341/ns524/ns673/white_paper_c11-649337.html>>, Retrieved Date: May 27, 2013, 6 pages.
Reardon, Marguerite, "Ending the headaches of Wi-Fi", Retrieved at http://news.cnet.com/8301-1035_3-57586189-94/ending-the-headaches-of-wi-fi/, May 28, 2013, CNET News, 5 pages.
(Continued)

*Primary Examiner* — Chi H Pham
*Assistant Examiner* — Weibin Huang
(74) *Attorney, Agent, or Firm* — Qudus Olaniran; Judy Yee; Micky Minhas

(57) ABSTRACT

Embodiments produce a set of instructions for connecting to a network through a network access point based on data crowdsourced from mobile computing devices. The crowdsourced data describes interactions between the mobile computing devices and the network access point when establishing a connection to the network. A cloud service analyzes the crowdsourced data to identify a set of instructions for association with the network access point. The mobile computing devices replay the set of instructions when subsequently attempting to connect to the network access point.

20 Claims, 9 Drawing Sheets

(56) References Cited

U.S. PATENT DOCUMENTS

| | | |
|---|---|---|
| 2010/0100725 A1 | 4/2010 | Ozzie et al. |
| 2010/0287229 A1 | 11/2010 | Hauser |
| 2012/0113813 A1* | 5/2012 | Haverinen ......... H04L 12/2697 370/241 |
| 2012/0167185 A1 | 6/2012 | Menezes et al. |
| 2012/0209839 A1* | 8/2012 | Andrews ............... G06Q 10/10 707/728 |
| 2012/0210011 A1 | 8/2012 | Liu et al. |
| 2012/0246553 A1 | 9/2012 | Ong |
| 2012/0297190 A1 | 11/2012 | Shen et al. |
| 2013/0080348 A1 | 3/2013 | Pantaliano et al. |
| 2013/0128815 A1* | 5/2013 | Scherzer ............... H04W 84/18 370/328 |
| 2013/0268632 A1* | 10/2013 | Baron .................... H04L 67/02 709/219 |
| 2014/0068030 A1 | 3/2014 | Chambers et al. |

OTHER PUBLICATIONS

Bhatt, et al., "Protect online facilities using User Authentication depend on Cloud", Retrieved at <<http://ijeit.com/vol%201/Issue %202/IJEIT1412201202_06.pdf>>, International Journal of Engineering and Innovative Technology (IJEIT), vol. 1, Issue 2, Feb. 2012, 4 pages.

"Login Assistant", Retrieved at www.loginassistant.net, Retrieved date: Jul. 30, 2013, 3 pages.

U.S. Appl. No. 14/081,202, "Applying Sequenced Instructions to Connect Through Captive Portals", filed Nov. 15, 2013, 34 pages.

"International Search Report & Written Opinion for PCT Application No. PCT/US2014/065583", Mailed Date: Apr. 9, 2015, 11 Pages.

"What is Fon?", press notes, Jan. 30, 2014, 3 pages; Available at: https://corp.fon.com/en/media/press-notes?field_date_ value%5Bvalue%5D%5Byear%5D&field_note_type_tid= All&=Apply.

* cited by examiner

GENERATING SEQUENCED INSTRUCTIONS FOR CONNECTING THROUGH CAPTIVE PORTALS

CROSS-REFERENCE TO RELATED APPLICATION

This application is related to a U.S. Patent Application entitled "Applying Sequenced Instructions to Connect Through Captive Portals," which is incorporated by reference herein in its entirety.

BACKGROUND

The availability of network access points, such as wireless fidelity (Wi-Fi) hotspots, has increased significantly. Many of these access points are gated and require user intervention for connection to the Internet or other networks. For example, the user may be required to accept terms and conditions, provide an email address or hotel room number, etc. Some existing solutions attempt to help the users connect to networks, such as by managing multiple passwords with a single authentication personal identification number (PIN). Some other existing solutions attempt to locate Wi-Fi hotspots near the user. However, these solutions lack a seamless auto-connect experience and fail to leverage understanding gained from connection attempts by other users.

SUMMARY

Embodiments of the disclosure produce a set of instructions for connecting to a network through a captive portal based on data crowdsourced from mobile computing devices. A first computing device receives, from each of a plurality of second computing devices, data describing an interaction between the second computing device and a network access point when establishing a connection to a network. The received data is analyzed to identify a set of instructions for association with the network access point. The identified set of instructions is distributed to one or more of the plurality of second computing devices. The one or more of the plurality of second computing devices applies the distributed set of instructions when attempting to connect to the network access point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
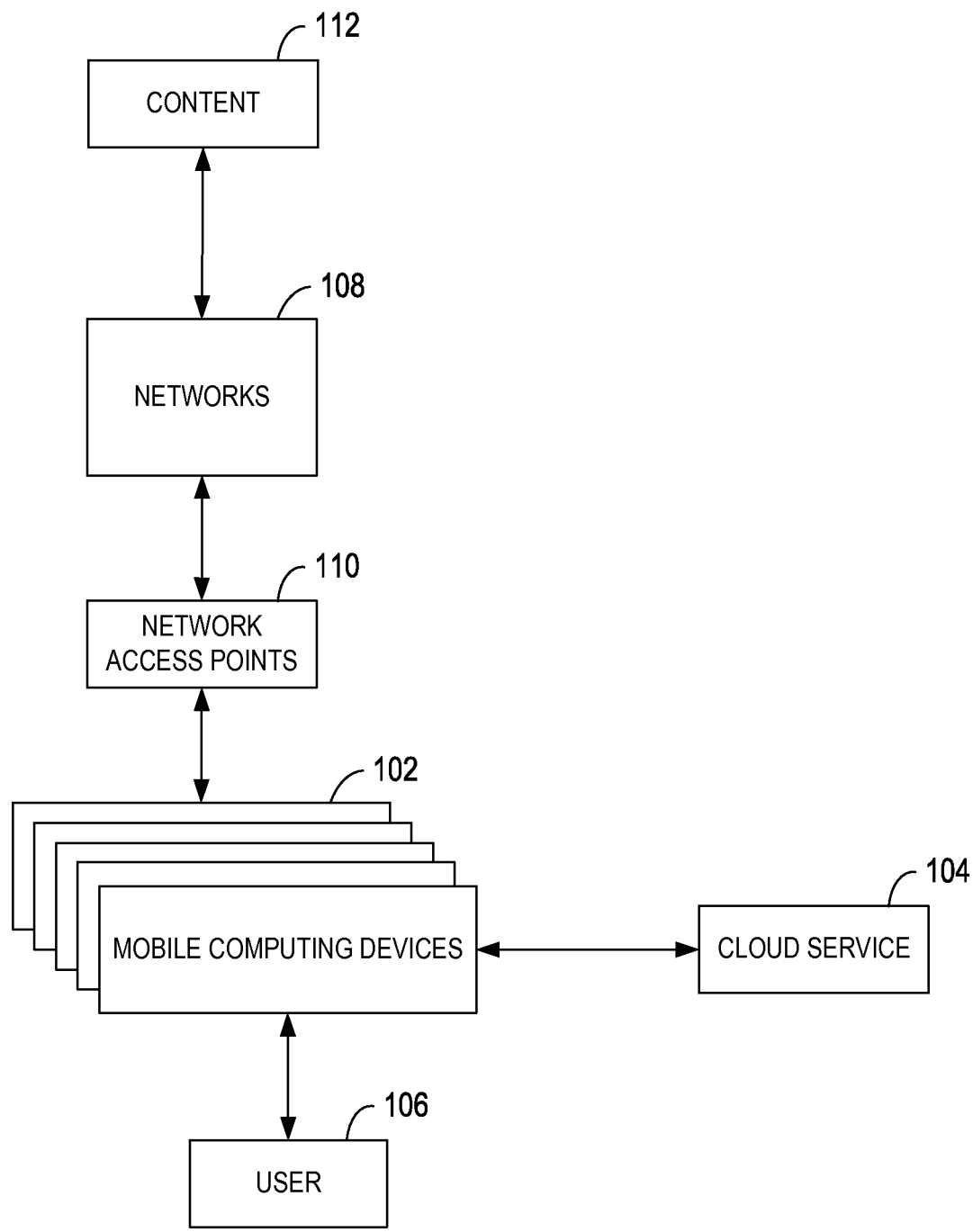
FIG. 1 is an exemplary block diagram illustrating a cloud service communicating with mobile computing devices that connect to networks.

Referring to the figures, embodiments of the disclosure generate sequenced instruction sets for replay by mobile computing devices 102 to connect to networks 108 through network access points (NAPs) 110. In some embodiments, a cloud service 104 crowdsources data sessions (e.g., logs) to learn how users 106 typically navigate through each of the NAPs 110. For example, the cloud service 104 reconstructs a series of events that occurred to connect the mobile computing devices 102 through the gated NAPs 110. The cloud service 104 distributes the sequenced instruction sets to one or more of the mobile computing devices 102 for replay, by the mobile computing devices 102 on behalf of the users 106, during subsequent connection attempts through the NAPs 110. Aspects of the disclosure thus eliminate the challenges, friction, and tediousness encountered when attempting to connect to the networks 108 by enabling connections in an automated and seamless manner.

The gated NAPs 110 may be described as captive portals with click-through user interfaces. For example, when the user 106 of the mobile computing device 102 accesses the Internet at a hotel, the mobile computing device 102 is redirected to a captive portal web page. The captive portal web page may present advertisements, receive acceptance of terms and/or conditions of use, present confirmation screens, accept text input (e.g., shared keywords for gaining access to the networks 108), and the like. The crowdsourced data sessions include, as an example, user actions, over-the-air (OTA) data such as hypertext transfer protocol (HTTP) requests and responses, device hardware context, device software context, any enterprise context, and data describing the NAPs 110.

Aspects of the disclosure adapt to changing NAPs 110 by detecting the changes, updating the instruction sets, and pushing the updated instruction sets to the mobile computing devices 102, all without explicit user intervention. Aspects of the disclosure further enable automatic connection to NAPs 110 without user intervention by automatically replaying the appropriate instruction set when connecting to one of the NAPs 110. While some embodiments may be described as implemented by a wireless fidelity (Wi-Fi) assist module, aspects of the disclosure are operable with any communications protocol. For example, the mobile computing device 102 may automatically connect to a free network through a Wi-Fi hotspot by accepting default terms of service (ToS), by accepting ToS with values inserted by scripts executing on the mobile computing device 102, by accepting ToS with text input values (e.g., electronic mail address, telephone number, name, etc.), and/or by providing a shared key (e.g., password).

Referring next to FIG. 1, an exemplary block diagram illustrates the cloud service 104 communicating with one or more of the mobile computing devices 102. In the example of FIG. 1, the user 106 interacts with the mobile computing device 102, or any other computing device of the user 106, to access content 112 via the network 108. The mobile computing device 102 connects to one or more of the networks 108 through one or more NAPs 110, such as a Wi-Fi beacon and a cellular tower. For each NAP 110, the mobile computing device 102 may perform a series of actions to gain access, via the NAP 110, to the network 108 associated with the NAP 110. After gaining access to the network 108 through the NAP 110, the mobile computing device 102 is able to transmit and receive the content 112. In this manner, the NAP 110 acts as a captive portal.

Communication between the mobile computing device 102 and other devices may occur using any protocol or mechanism over any wired or wireless connection. For example, the mobile computing device 102 may attempt to transmit and/or receive data over a Wi-Fi network, a cellular network, a satellite network, a whitespace network, or any network 108. In some embodiments, a NAP 110 is defined to include all NAPs 110 that share the same SSID within a particular geographic area (e.g., 100-meter radius). For example, a plurality of NAPs 110 within an airport may share the same SSID.

As described further herein, the cloud service 104 collects information from the mobile computing devices 102 describing the series of actions performed by the mobile computing devices 102 when connecting to the networks 108 through the NAPs 110. Such interaction data 206 is processed by the cloud service 104 to generate sequenced instructions 308 for use by the mobile computing devices 102 when subsequently connecting to the networks 108.

Figure 2:
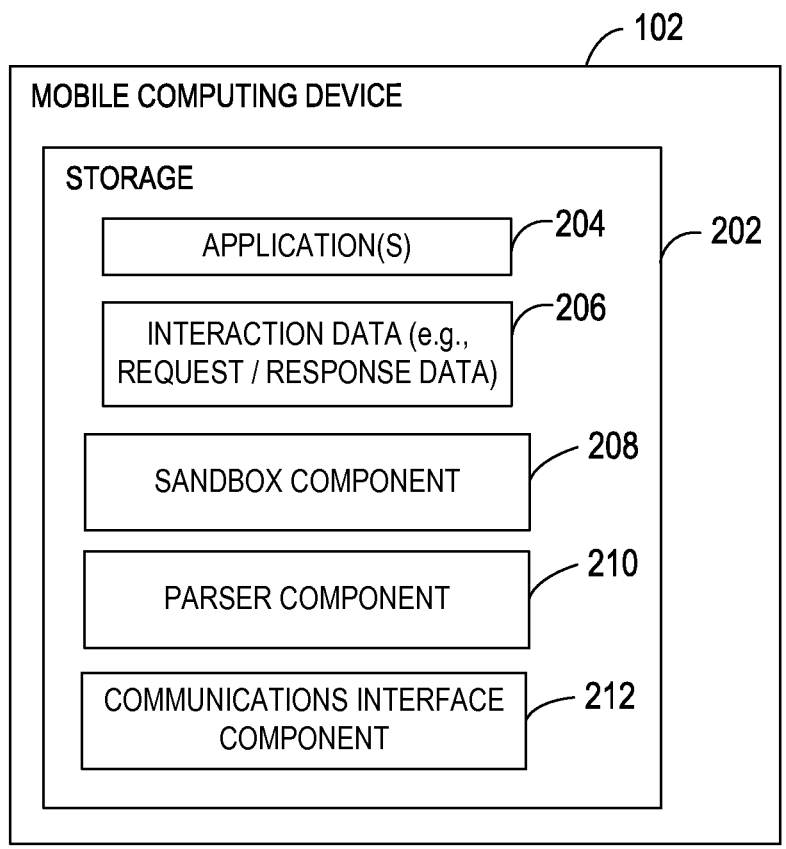
FIG. 2 is an exemplary block diagram illustrating a mobile computing device storing computer-executable components for capturing interaction data between the mobile computing device and network access points.

Referring next to FIG. 2, an exemplary block diagram illustrates the mobile computing device 102 storing computer-executable components for capturing the interaction data 206 between the mobile computing device 102 and NAPs 110. The components, maintained in storage 202, include a sandbox component 208, a parser component 210, and a communications interface component 212. In some embodiments, the communications interface component 212 includes a network interface card and/or computer-executable instructions (e.g., a driver) for operating the network interface card. Operation of these components, when executed, is described below with reference to FIG. 5.

The storage 202 also includes one or more applications 204, and the interaction data 206. The applications 204 operate to perform functionality on the mobile computing device 102. Exemplary applications 204 include mail application programs, web browsers, calendar application programs, address book application programs, messaging programs, media applications, location-based services, search programs, and the like. The applications 204 may communicate with counterpart applications or services such as web services accessible via the networks 108. For example, the applications 204 may represent downloaded client-side applications that correspond to server-side services executing in a cloud.

The interaction data 206 in the storage 202 of the mobile computing device 102 represents the interactions captured by the mobile computing device 102 when connecting to the networks 108. The interaction data 206 may also represent interactions captured by other mobile computing devices 102 and received from those mobile computing devices 102, and/or received from the cloud service 104.

Figure 3:
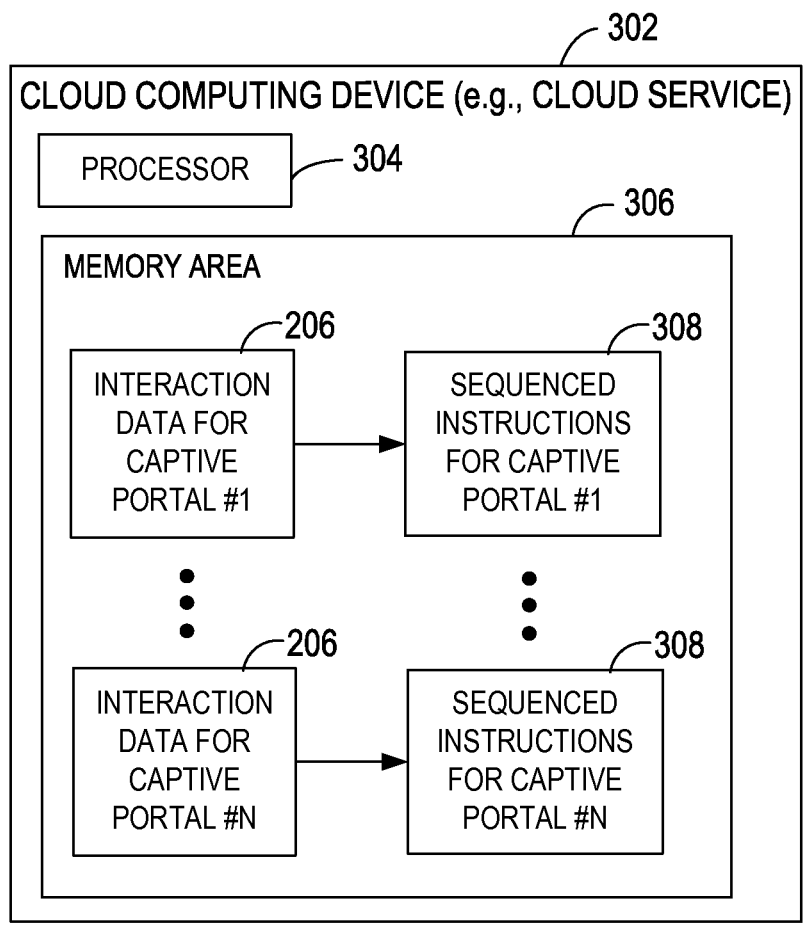
FIG. 3 is an exemplary block diagram illustrating a computing device storing sets of sequenced instructions for connecting to captive portals.

Referring next to FIG. 3, an exemplary block diagram illustrates a computing device, associated with the cloud service 104, storing sets of sequenced instructions 308 for connecting to captive portals. Such a cloud computing device 302 represents a system for producing a set of instructions 308 for connecting to the networks 108 through captive portals based on data crowdsourced from the mobile computing devices 102. The cloud computing device 302 represents any device executing instructions (e.g., as application programs, operating system functionality, or both) to implement the operations and functionality associated with the cloud service 104. Such a device may also be a peer device to the mobile computing devices 102. The cloud computing device 302 may also represent a group of processing units or other computing devices. In another example, the cloud computing device 302 may include a mobile computing device or any other portable device, such as a mobile telephone, laptop, tablet, computing pad, netbook, gaming device, and/or portable media player. Alternatively or in addition, the cloud computing device 302 may include less portable devices such as desktop personal computers, kiosks, tabletop devices, industrial control devices, wireless charging stations, and electric automobile charging stations.

In some embodiments, the cloud computing device 302 has at least one processor 304 and a memory area 306. The cloud computing device 302 may further have one or more communications interfaces (not shown) including at least one network interface card and/or computer-executable instructions (e.g., a driver) for operating the network interface card. The processor 304 includes any quantity of processing units, and is programmed to execute computer-executable instructions for implementing aspects of the disclosure. The instructions may be performed by the processor 304 or by multiple processors executing within the cloud computing device 302, or performed by a processor external to the cloud computing device 302. In some embodiments, the processor 304 is programmed to execute instructions such as those illustrated in the figures (e.g., FIG. 4).

In some embodiments, the processor 304 represents an implementation of analog techniques to perform the operations described herein. For example, the operations may be performed by an analog computing device and/or a digital computing device.

The cloud computing device 302 further has one or more computer readable media such as the memory area 306. The memory area 306 includes any quantity of media associated with or accessible by the cloud computing device 302. The memory area 306 may be internal to the cloud computing device 302 (as shown in FIG. 3), external to the cloud computing device 302 (not shown), or both (not shown). In some embodiments, the memory area 306 includes read-only memory and/or memory wired into an analog computing device.

The memory area 306 further stores the interaction data 206, such as manual portal assist data, describing actions performed by the users 106 when connecting to the networks 108. The interaction data 206 stored by the cloud service 104 is crowdsourced, or otherwise received, from a plurality of the mobile computing devices 102. In some embodiments, the interaction data 206 includes request and response data from a web browser, such as HTTP request and HTTP response data. However, the interaction data 206 may represent data in any form or protocol.

In the example of FIG. 3, the memory area 306 stores the interaction data 206 for a plurality of the captive portals, such as for captive portal #1 through captive portal #N. As illustrated and described with reference to FIG. 4, the cloud computing device 302 generates sequenced instructions 308 from the interaction data 206 for the captive portals. As a result, the memory area 306 stores correlations, associations, and/or correspondences between the interaction data 206 for each of the captive portals and the sequenced instructions 308 for that captive portal.

Figure 4:
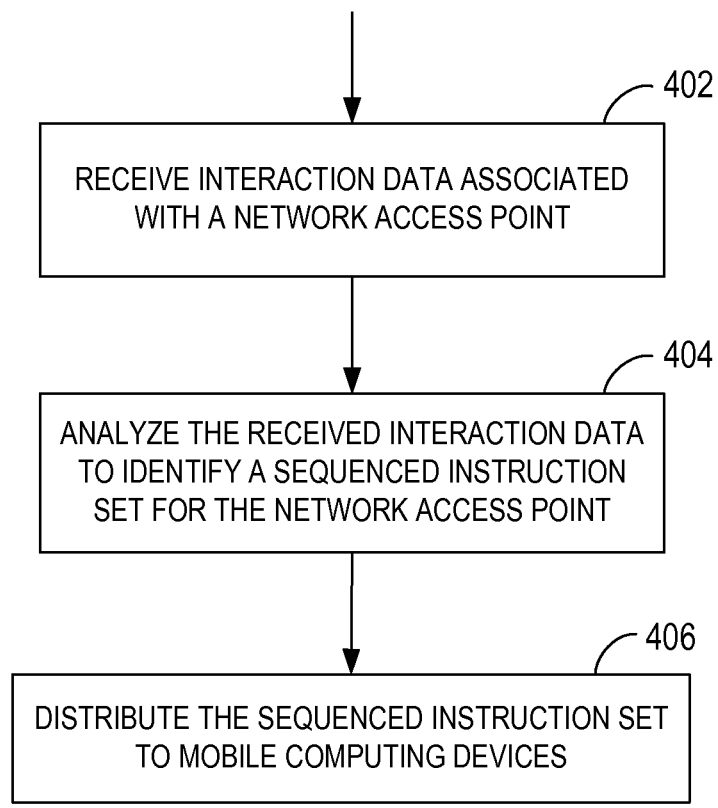
FIG. 4 is an exemplary flow chart illustrating operation of the cloud service to crowdsource interaction data to produce a sequenced instruction set.

Referring next to FIG. 4, an exemplary flow chart illustrates operation of the cloud service 104 to crowdsource interaction data 206 to produce a sequenced instruction set. The operations illustrated in FIG. 4 are described with reference to execution by the cloud computing device 302. However, aspects of the disclosure contemplate execution of the operations by other devices or processors, such as by one or more of the mobile computing devices 102. Further, while an exemplary instruction set schema is described in Appendix A, aspects of the disclosure are operable with any instruction set schema.

At 402, the cloud computing device 302 (e.g., a first computing device) receives, from each of a plurality of the mobile computing devices 102 (e.g., second computing devices), the interaction data 206 describing an interaction between the mobile computing device 102 and at least one of the NAPs 110 when establishing a connection to at least one of the networks 108. The interaction data 206 represents any set of actions, operations, procedures, or other steps undertaken when attempting to establish the connection. In some embodiments, the interaction data 206 is described as manual portal assist data.

Receiving the interaction data 206 includes, for example, receiving a history of request and response data from a browser or other client executing on each of the mobile computing devices 102. Each received history represents a successful or unsuccessful attempt by the mobile computing device 102 to connect to one of the networks 108 through one of the NAPs 110. The history may include data indicating whether or not connection to the NAP 110 was successful. In other embodiments, such data is separate from the history. An example of the data indicating whether or not connection to the NAP 110 was successful is described in Appendix B.

At 404, the cloud computing device 302 analyzes the received interaction data 206 from the plurality of mobile computing devices 102 to identify a set of sequenced instructions 308 for association with the NAP 110. In some embodiments, identifying the set of sequenced instructions 308 for the NAP 110 occurs only after the cloud computing device 302 has received interaction data 206 for that NAP 110 from a threshold quantity of users 106 (e.g., 5, 10, etc.).

Analyzing the interaction data 206 includes, for example, grouping the interaction data 206 per NAP 110 (e.g., captive portal) and analyzing each web page separately. The cloud computing device 302 looks at the differences in the interaction data 206 for that captive portal across each of the users 106.

Identifying the set of sequenced instructions 308 includes, for example, enumerating the instructions 308 (e.g., step-by-step) for connecting through the captive portal by iteratively processing the interaction data 206 with machine learning algorithms. For example, the cloud computing device 302 creates a chain of actions from a first request to a last request to identify the user interactions performed to connect through the captive portal. The cloud computing device 302 enumerates the actions performed by the user 106, such as clicking on a hyperlink, executing scripts, completing a form, etc.

In some embodiments, analyzing the received interaction data 206 includes comparing the received interaction data 206 to pre-defined set of actions to recognize a pattern. In such embodiments, the cloud computing device 302 stores a plurality of pre-defined user actions. The pre-defined actions may be accumulated, over time, from the mobile computing devices 102 and/or input by an administrator or other operator of the cloud computing device 302. In some embodiments, the cloud computing device 302 stores pre-defined sets of user actions, such as those received from the NAPs 110. For example, one of the NAPs 110 may publish data describing how to connect through the NAP 110 to one of the networks 108, and the cloud computing device 302 may retrieve the published data.

If the cloud computing device 302 is able to link all the web pages from first to last in the interaction data 206 (e.g., by identifying page transitions, determining how one page led to another page, and/or matching or recognizing at least one of the patterns of pre-defined user actions), the cloud computing device 302 creates the sequenced instruction set from the interaction data 206. Creating the sequenced instruction set includes, as an example, assigning at least one verb to each action. Verbs are described below. If the cloud computing device 302 cannot link the web pages from the interaction data 206, the cloud computing device 302 discards the interaction data 206 in some embodiments.

Analyzing the received interaction data 206 may include, in some embodiments, constructing one or more sign-on signatures for the NAP 110, and then analyzing at least one of the sign-on signatures. The sign-on signatures represent patterns where the user 106 went through the same steps to connect through the same captive portal. Based on the constructed sign-on signatures, the cloud computing device 302 identifies one or more paths. The paths represent different methods for connecting through the same NAP 110. The cloud computing device 302 creates the instruction set for one or more of the paths. In some embodiments, the cloud computing device 302 creates the instruction set for the path taken by a majority, or some threshold quantity, of the mobile computing devices 102.

Exemplary paths includes a free path and a paid path. The free path represents a set of actions for obtaining access to the network 108 without paying a fee. The paid path represents a different set of action for obtaining access to the network 108 through the same NAP 110 as the free path, but by paying a fee. For example, the paid path may be taken by the users 106 who pay a monthly fee to a service provider, or who have purchased a particular amount of time on the network 108 (e.g., hourly pass, daily pass, etc.).

In some embodiments, the sequenced instruction set includes a set of extensible markup language (XML) instructions 308. The XML instructions 308 include a sequence of verbs for execution to connect through the NAP 110. An example structure of a sequenced instruction set is shown below:

```
<Script>
    <Operation xsi:type=Verbname>
        <Param1> Value1</Param1>
        <Param2> Value2</Param2>
```

```
        </Operation>
        <Operation xsi:type=Verbname>
            ...
        </Operation>
        ...
    </Script>
```

At 406, the cloud computing device 302 distributes the identified set of sequenced instructions 308 to one or more of the plurality of mobile computing devices 102. For example, the cloud computing device 302 receives the interaction data 206 from a first set of the mobile computing devices 102, and distributes the identified set of sequenced instructions 308 to a second set of the mobile computing devices 102. Some of the mobile computing devices 102 may be in both the first set and the second set. The first set and the second set may be different or identical.

In some embodiments, the cloud computing device 302 provides the identified set of sequenced instructions 308 to a distribution service that communicates with the mobile computing devices 102. In an example, the NAP 110 provides network 108 access to a geographic area (e.g., to the mobile computing devices 102 within range of the NAP 110). In this example, the cloud computing device 302 distributes the identified set of instructions 308 only to one or more of the mobile computing devices 102 located within the geographic area. The cloud computing device 302 is able to identify the mobile computing devices 102 located within a geographic area by using location services available on the mobile computing devices 102. In another example, the cloud computing device 302 receives location information from a plurality of the mobile computing devices 102. Exemplary location information includes a street address, zip code, global positioning system (GPS) coordinates, landmark information, and/or other location or position information. The cloud computing device 302 selects, based on the received location information, the mobile computing devices 102 to receive the identified set of instructions 308. For example, the cloud computing device 302 selects the mobile computing devices 102 that have provided the location information corresponding to a location associated with the NAP 110 corresponding to the identified set of instructions 308.

In some embodiments, the cloud computing device 302 distributes the sequenced instruction sets to the mobile computing devices 102 via one or more geospatial tile data structures (e.g., "tiles"). Each tile stores the sequenced instruction sets for the NAPs 110 within a particular geographic area (e.g., within one square mile). As an example, each tile stores information such as a service set identifier (SSID) and basic service set identifier (BSSID) of the NAPs 110, the locations of the NAPs 110, and the sequenced instruction sets for connecting to the networks 108 through the NAPs 110. As a further example, the tiles may store connection quality data for each of the networks 108 describing the anticipated, expected, and/or predicted experience of the applications 204 executing on the mobile computing devices 102 when transmitting and/or receiving data over that network 108. One or more of the tiles may be downloaded (e.g., once a day) by the mobile computing devices 102 for caching.

Alternatively or in addition, the cloud computing device 302 distributes the sequenced instruction sets to the mobile computing devices 102 via network-specific queries. For example, the mobile computing devices 102 may request the sequenced instruction sets corresponding to particular networks 108.

The mobile computing devices 102 store the sequenced instructions 308 provided by the cloud computing device 302, and apply the sequenced instructions 308 when subsequently attempting to connect to the NAP 110 corresponding to the sequenced instructions 308. In some embodiments, the mobile computing devices 102 report back to the cloud computing device 302 after applying the sequenced instructions 308 to attempt to connect to the NAP 110. The connection report identifies, as an example, whether or not the connection was successful. If the connection was unsuccessful, the connection report may further indicate at which instruction the connection attempt failed.

Upon receiving the connection report for the NAP 110 from the mobile computing device 102, the cloud computing device 302 may update, adjust, modify, or otherwise change the sequenced instructions 308 for the NAP 110 based on the received connection report. For example, the cloud computing device 302 may remove the sequenced instructions 308 for the NAP 110 if a success rate from the mobile computing devices 102 falls below a pre-defined threshold. As another example, the cloud computing device 302 may throttle data collection (e.g., crowdsource more or less of the interaction data 206) from the mobile computing devices 102. For example, if a success rate for one or more of the instructions 308 falls below a pre-defined threshold (e.g., 95%), the cloud computing device 302 may send a command to one or more of the mobile computing devices 102 to increase data collection for one or more of the NAPs 110 to accommodate for changes at those NAPs 110. The cloud computing device 302 may also send a command to decrease data collection if the cloud computing device 302 has enough data for a particular NAP 110. In some embodiments, the cloud computing device 302 sends the command by updating a flag in a geospatial tile to implement the throttling.

In still another example, the cloud computing device 302 may modify a particular instruction in the set of sequenced instructions 308 to reduce the likelihood of failure at that particular instruction for subsequent attempts, and then distribute the modified set of sequenced instructions 308 to one or more of the mobile computing devices 102. Distributing the modified set of sequenced instructions 308 to one of the mobile computing devices 102 may occur on demand by the mobile computing device 102, and/or without first receiving a request from that mobile computing device 102. For example, the cloud computing device 302 may push the modified set of sequenced instructions 308 to the mobile computing devices 102.

In some embodiments, operations for processing the interaction data 206 by the cloud computing device 302 are organized into categories including pre-processing, hotspot aggregation, business aggregation, refining, computation, and opt-out. Exemplary pre-processing operations include, but are not limited to, extracting and validating a log of the interaction data 206, filtering personally identifiable information, and obscuring device identifiers. Exemplary hotspot aggregation operations include, but are not limited to, identifying a signature associated with the interaction data 206, and joining the interaction data 206 to a hotspot identifier for aggregation. Identifying the signature is based on, for example, the quantity of steps in the session, key names in the POST and GET requests, and the HTML schema. Exemplary business aggregation operations include, but are not limited to, aggregating based on hotspot signature and SSID, as the hotspots associated with a single entity may carry the same captive portal. Exemplary refining operations include, but are not limited to, filtering based on unique user identifier count (e.g., above a minimum threshold) to achieve reliability. Exemplary computation operations include, but are not limited to, generating the instructions 308 such as described with reference to FIG. 4, FIG. 8, and FIG. 9. Exemplary opt-out operations include, but are not limited to, filtering the instructions 308 that that relate to captive portals that have opted-out of participation.

Capture of the interaction data 206 by the mobile computing devices 102 to formulate the sequenced instruction sets is next described.

Figure 5:
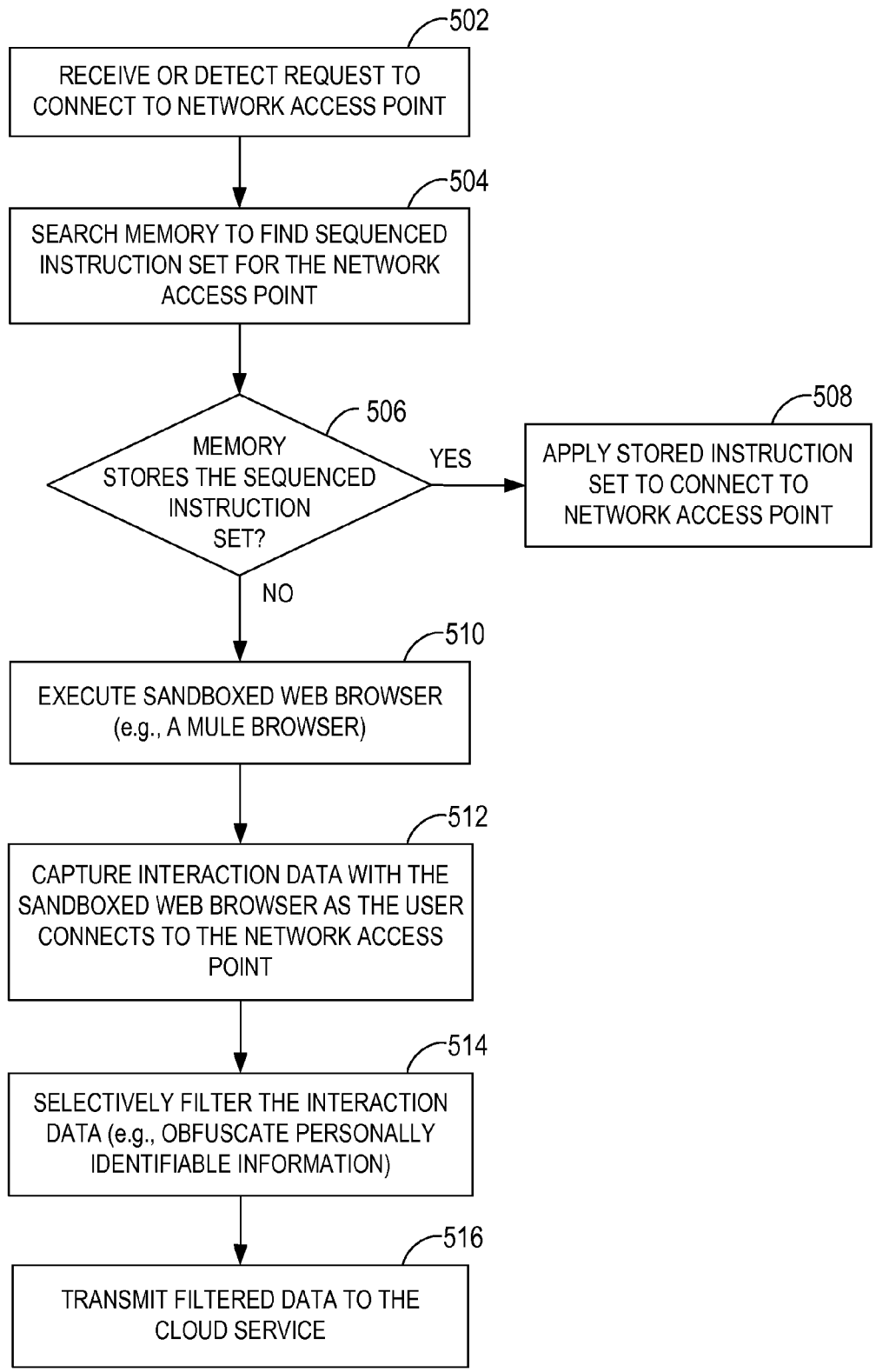
FIG. 5 is an exemplary flow chart illustrating operation of the mobile computing device to capture interaction data when connecting to a network access point.

Referring next to FIG. 5, an exemplary flow chart illustrates operation of the mobile computing device 102 to capture interaction data 206 when connecting to one of the NAPs 110. The operations illustrated in FIG. 5 are described with reference to execution by the mobile computing devices 102. However, aspects of the disclosure contemplate execution of the operations by other devices or processors, such as by less portable computing devices including kiosks, desktop computers, and gaming consoles. Further, while some operations are described with reference to execution of the computer-executable components embodied or otherwise stored in the storage 202 of the mobile computing device 102, one or more of the operations may be performed by other components or modules of the mobile computing device 102.

At 502, the mobile computing device 102 receives or detects a request to connect to one of the NAPs 110. For example, one of the applications 204 executing on the mobile computing device 102 may request to send and/or receive data over one of the networks 108. An operating system executing on the mobile computing device 102 receives the request, such as via an application programming interface (API). At 504, the mobile computing device 102 searches the storage 202 to find the sequenced instruction set corresponding to the NAP 110. If the storage 202 contains the sequenced instruction set for the NAP 110 at 506, the mobile computing device 102 retrieves and applies the set of instructions 308 to connect to the NAP 110 at 508.

If the storage 202 does not contain the sequenced instruction set for the NAP 110 at 506, the mobile computing device 102 executes a sandboxed web browser at 510. The sandboxed web browser represents a mule browser, or other browser with limited functionality. In some examples, the sandboxed web browser only allows the user 106 to enter data to attempt to connect to the NAP 110 (e.g., accept terms and conditions, enter a user name, enter a hotel room number, enter a password, etc.).

At 512, the sandbox component 208, when executed by the mobile computing device 102, causes the mobile computing device 102 to capture the user interaction with the NAP 110 using the sandboxed web browser. In some embodiments, the sandbox component 208 prevents the user 106 from performing any action other than connecting through the NAP 110. The sandbox component 208 continues to capture the interaction data 206 until the connection is established, or the connection attempt has been deemed unsuccessful. For example, the sandbox component 208 periodically or intermittently tests for the connection for a pre-defined duration (e.g., in seconds) until the connection is established. In another example, the sandbox component 208 tests for connectivity after each HTTP request and/or HTTP response operation.

At 514, the parser component 210, when executed by the mobile computing device 102, causes the mobile computing device 102 to selectively filter the captured interaction data 206. For example, the parser component 210 identifies and obfuscates personally identifiable information, such as user names, passwords, security questions, answers to security questions, and other sensitive or confidential information within the interaction data 206 captured by the sandbox component 208. As another example, the parser component 210 may filter images, videos, and/or resources (e.g., cascading style sheet files) from the captured interaction data 206. In some embodiments, the parser component 210 scrubs text between HTML tags, creates a one way hash of values contained in visible fields, annotates the one way hashed values in the visible controls with the type of value, and uses the same annotation (e.g., type and one way hash) for values entered in the visible control throughout the captured session). Exemplary types includes email, telephone number, and name (e.g., first name, last name, full name, etc.). In some examples, the parser component 210 filters the captured interaction data 206 based on one or more rules (e.g., set by the user 106, operator of the cloud computing device 302, operating system on the mobile computing device 102, NAP 110 administrator, etc.).

At 516, the communications interface component 212, when executed by the mobile computing devices 102, causes the mobile computing device 102 to transmit the filtered interaction data 206 to the cloud service 104. For example, the transmission may occur immediately after the interaction data 206 is captured, or may be sent at some later time (e.g., as part of a nightly batch, upon request, etc.).

Figure 6:
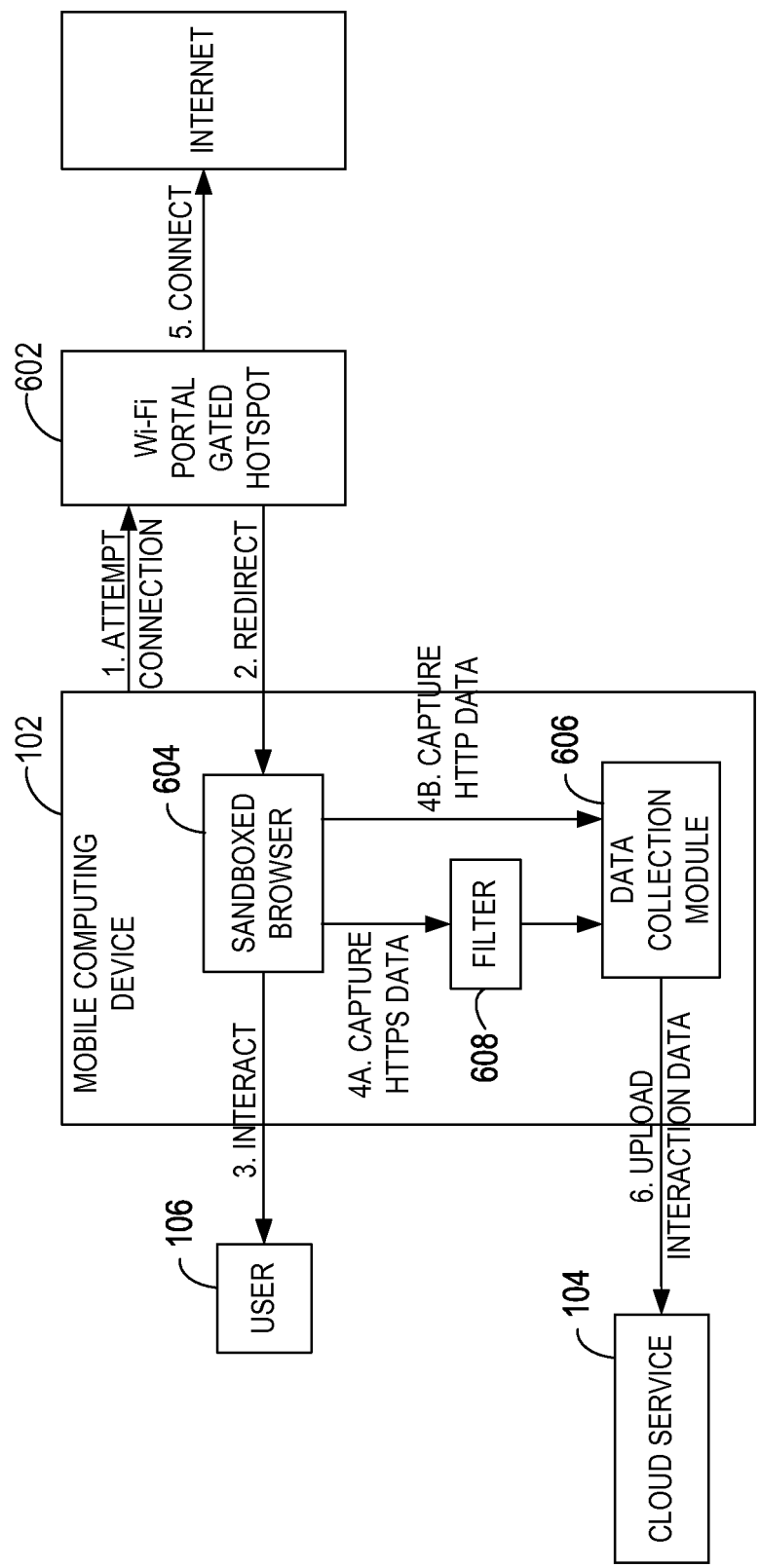
FIG. 6 is an exemplary block diagram illustrating data collection on a mobile computing device with device-side filtering of personally identifiable information.

Referring next to FIG. 6, an exemplary block diagram illustrates data collection on the mobile computing device 102 with device-side filtering of personally identifiable information. While a particular sequence of operations is illustrated in FIG. 6, other sequences are within the scope of the disclosure.

In the example of FIG. 6, the mobile computing device 102 includes a sandboxed browser 604, a filter, and a data collection 606. The mobile computing device 102 attempts to connect to one of the NAPs 110, such as a Wi-Fi portal gated hotspot. The Wi-Fi portal gated hotspot checks a login database or other repository to determine whether the mobile computing device 102 has been authenticated. If the mobile computing device 102 has been authenticated, the Wi-Fi portal gated hotspot allows the mobile computing device 102 to access the Internet.

If the mobile computing device 102 has not been authenticated, the Wi-Fi portal gated hotspot redirects the sandboxed browser 604 executing on the mobile computing device 102 to a captive portal web page. The user 106 interacts with the executing sandboxed browser 604 to connect to the Internet, or other network 108, via the Wi-Fi portal gated hotspot by gaining access through the captive portal web page. For example, the user 106 traverses web pages of the captive portal to accept terms of service, or complete other tasks. During this process, the sandboxed browser 604 captures HTTP data and secure HTTP data (e.g., HTTPS). The captured HTTPS data is passed through the filter to selectively remove data, such as personally identifiable information. The HTTP data and the filtered HTTPS data is stored by the data collection 606, and uploaded or otherwise transmitted to the cloud service 104 for processing.

Selectively removing the personally identifiable information from the HTTPS data includes, as an example, removing data entered into fields by the user 106. Some embodiments strip the field data from the HTTPS data and replace such data with a hash of the field data. A tag may also be added to indicate the type of field data that was stripped (e.g., telephone number, email, password, etc.).

After connecting through the captive portal, the Wi-Fi portal gated hotspot 602 submits device information and/or user information to the login database.

Figure 7:
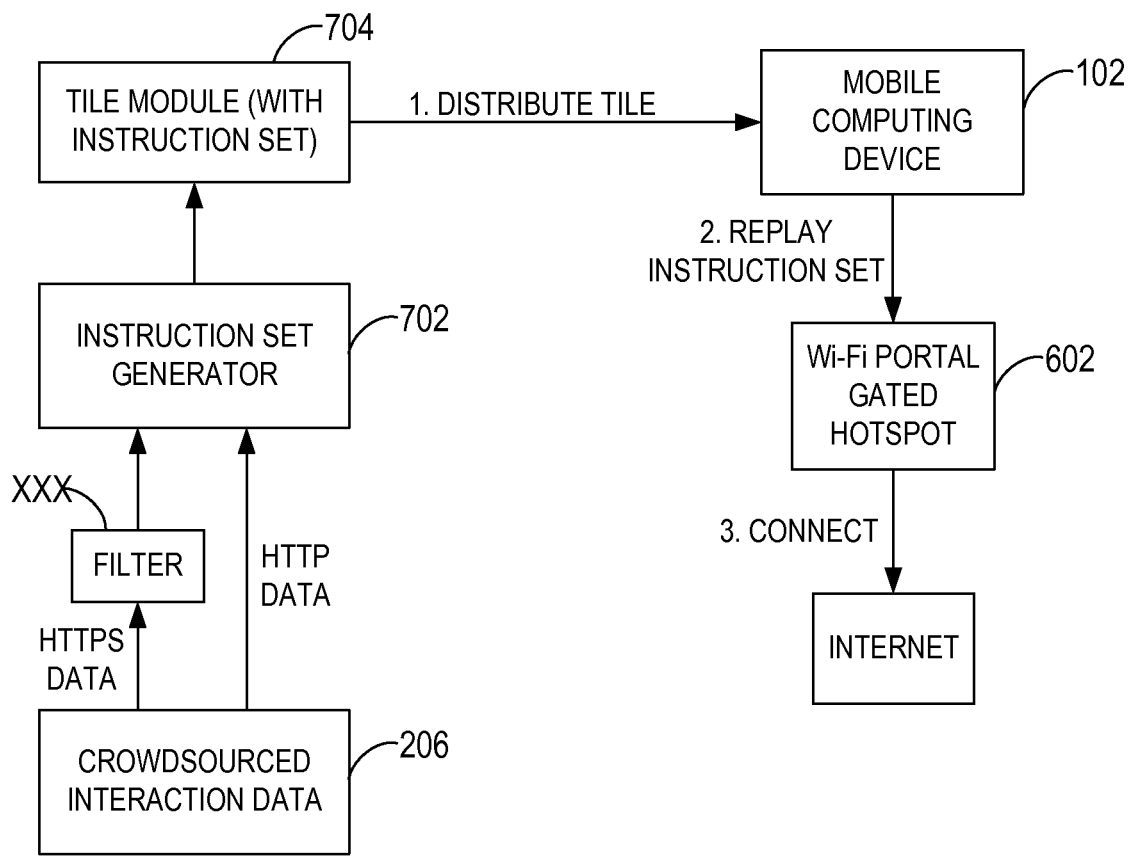
FIG. 7 is an exemplary block diagram illustrating distribution of a sequenced instruction set after cloud-based filtering of personally identifiable information.

Filtering the HTTPS data may occur on the mobile computing device 102 as illustrated in FIG. 6 and/or on the cloud computing device 302 as illustrated in FIG. 7.

Referring next to FIG. 7, an exemplary block diagram illustrates distribution of a sequenced instruction set after cloud-based filtering of personally identifiable information. While a particular sequence of operations is illustrated in FIG. 7, other sequences are within the scope of the disclosure.

In the example of FIG. 7, the HTTPS data crowdsourced by the cloud computing device 302 is processed by the filter to selectively remove data, such as personally identifiable information. The HTTP data and the filtered HTTPS data are processed by an instruction set generator 702 to produce at least one of the sequenced instruction sets. For example, the instruction set generator 702 parses the HTTP data and the filtered HTTPS data to order the requests and responses in the order they were observed by the mobile computing device 102. The sequenced instruction set is distributed to the mobile computing devices 102 by, for example, a tile module 704.

The mobile computing device 102 replays the sequenced instruction set from the tile when connecting to the Wi-Fi portal gated hotspot 602 to connect to the Internet, or other network 108.

Additional Examples

An example language set for the sequenced instruction set is next described. Aspects of the disclosure, however, are operable with any set of verbs, operands, parameters, etc. Exemplary verbs include Probe for Connectivity (PC), Follow Redirect (FR), Follow Anchor (FA), Submit Form (SF), Navigate To (NT), and Submit Post String (SPS).

The PC verb may be the first verb in the instruction set, and probes for network connectivity by attempting to connect to a network location (e.g., a HTTP address). The FR verb follows the redirect from a previous browser page and retrieves a redirected browser page. Exemplary parameters to this verb include delay (e.g., a time delay before executing this verb), a redirect type (e.g., HttpRedirect, HtmlMetaRefresh, JavaScriptRefresh, etc.), and a timeout (e.g., a timeout for receiving a response from the web server). In XML, the FR verb may appear as shown below:

```
<Operation xsi:type="FollowRedirect">
    <Delay>0</Delay>
    <RedirectType>1</RedirectType>
    <Timeout>5000</Timeout>
</Operation>
```

The FA verb follows an anchor from a previous page and retrieves a target page identified by the anchor. Exemplary parameters to this verb include delay (e.g., a time delay before executing this verb), an anchor identifier (e.g., a zero-based index to the anchor on the previous page), and a timeout (e.g., a timeout for receiving a response from the web server). In XML, the FA verb may appear as shown below:

```
<Operation xsi:type="FollowAnchor">
    <Delay>0</Delay>
```

```
    <AnchorId>1</AnchorId>
    <Timeout>5000</Timeout>
</Operation>
```

The SF verb submits a form on a previous page and retrieves the response. The SF verb looks at the action attribute in the form to identify the post uniform resource location (URL). Exemplary parameters to this verb include delay (e.g., a time delay before executing this verb), a form identifier (e.g., a zero-based index to the forms on the previous page), a submit option (e.g., a flag to indicate how to obtain contents for the post request), one or more key-value pairs (e.g., a set of key-value pairs to include in the post request), and a timeout (e.g., a timeout for receiving a response from the web server). The submit option parameter may appear as shown below:

```
public enum FormFieldSubmitOption
{
    None,
    UseDefaultValues,
    EmptyValues,
    OverrideValues,
    SpecifiedPairsOnly,
}
```

Exemplary key-value pairs include one or more of the following predefined expressions which are replaced by the mobile computing device 102: % WPEmail % replaced with an email address of the user 106, % WPPhone % replaced with a telephone number of the user 106, % WPFirstName % replaced with a first name of the user 106, % WPLastName % replaced with a last name of the user 106, % WPName % replaced with a complete name of the user 106, % WPIPAddress % replaced with an Internet Protocol (IP) address of the mobile computing device 102, and % WPMacAddress % replaced with media access control (MAC) address of the mobile computing device 102.

In XML, the SF verb may appear as shown below:

```
<Operation xsi:type="SubmitForm">
    <Delay>0</Delay>
    <FormId>0</FormId>
    <SubmitOption>1</SubmitOption>
    <KeyValuePairs>
        <KeyValuePair key="name" value="Anna"/>
        <KeyValuePair key="accessCode" value="A973BEEBD3BE78DD"/>
    </KeyValuePairs>
    <Timeout>5000</Timeout>
</Operation>
```

The NT verb retrieves the contents of the target page. Exemplary parameters to this verb include delay (e.g., a time delay before executing this verb), address (e.g., the destination URL), and timeout (e.g., a timeout for receiving a response from the web server). The address parameter may contain one or more predefined expressions in the query string, which are replaced by the mobile computing device 102 with the respective values. In XML, the NT verb may appear as shown below:

```
<Operation xsi:type="NavigateTo">
    <Delay>0</Delay>
```

```
            <Address>http://www....com</Address>
            <Timeout>5000</Timeout>
        </Operation>
```

The SPS verb is used to submit the specified post string to the specified address. Exemplary parameters to this verb include delay (e.g., a time delay before executing this verb), address (e.g., the destination URL), one or more key-value pairs (e.g., a set of key-value pairs to include in the post request), and a timeout (e.g., a timeout for receiving a response from the web server). The address parameter may contain one or more predefined expressions in the query string, which are replaced by the mobile computing device 102 with the respective values. In XML, the SPS verb may appear as shown below:

```
        <Operation xsi:type="SubmitPostString">
            <Delay>0</Delay>
            <Address>http://www....com</Address>
            <KeyValuePairs>
                <KeyValuePair key="name" value="Anna"/>
                <KeyValuePair key="accessCode"
    value="A973BEABD3BE45ED" encrypted="true"/>
            </KeyValuePairs>
            <Timeout>5000</Timeout>
        </Operation>
```

Use of the exemplary language set described above is next described with reference to FIG. 8 and FIG. 9.

Figure 8:
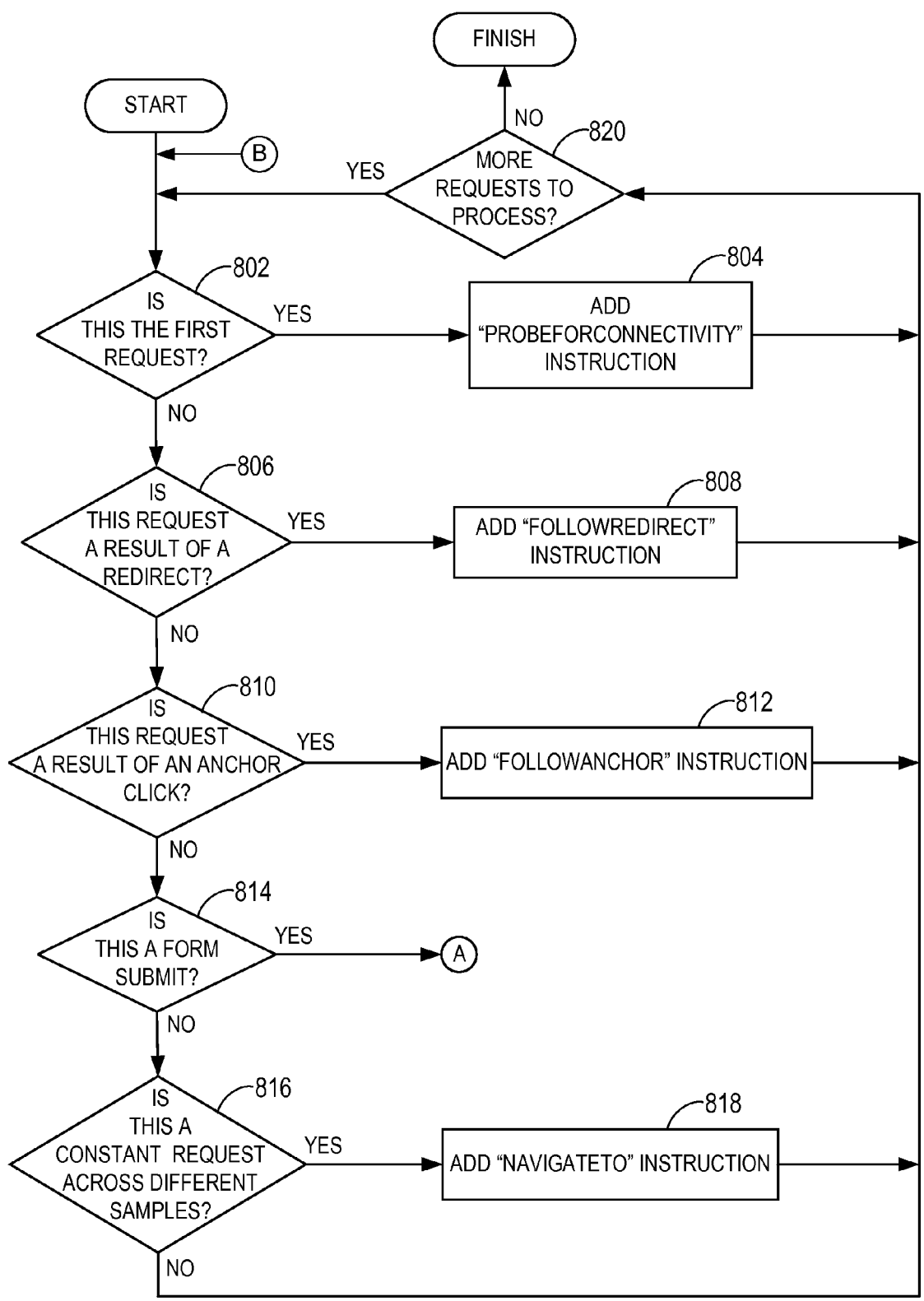
FIG. 8 is an exemplary flow chart illustrating operation of the cloud service to process interaction data into instruction set verbs.

Referring next to FIG. 8, an exemplary flow chart illustrates operation of the cloud service 104 to process interaction data 206 into instruction set verbs. The operations illustrated in FIG. 8 are described with reference to execution by the cloud computing device 302. However, aspects of the disclosure contemplate execution of the operations by other devices or processors, such as by one or more of the mobile computing devices 102.

The interaction data include request-response data, such as HTML data. An HTML header field, such as HTTP referrer, identifies the address of the webpage (e.g., the uniform resource identifier) that linked to the resource (e.g., destination webpage) being requested. By checking this header field, the destination webpage may see from where the request originated. For example, when the user 106 clicks a hyperlink in the browser 604, the browser 604 sends a request to the server holding the destination webpage. The request includes the header field, which indicates the last page the user 106 was on (e.g., where the user 106 clicked the link).

The request-response data is traversed in reverse order to create a referred and redirect chain. This process filters out requests that are insignificant to portal assistance, such as requests for asynchronous JAVASCRIPT brand code, requests for images, and the like. The remaining request-response data pairs are traversed one-by-one starting from the first data pair to find links between successive requests. An exemplary link-finding algorithm is next described.

At 802, the cloud computing device 302 determines whether the request being examined is the first request in the chain. If so, the PC verb is added to the sequenced instructions for this chain at 804. If not, the cloud computing device 302 determines whether the request is a result of a redirect operation at 806. If so, the FR verb is added to the sequenced instructions for this chain at 808. If not, the cloud computing device 302 determines whether the request is a result of an anchor click at 810. If so, the FA verb is added to the sequenced instructions for this chain at 812. If not, the cloud computing device 302 determines whether the request is a form submission at 814. If so, processing continues as described in FIG. 9 below. If not, the cloud computing device 302 determines whether the request is a constant request across different samples at 816. If so, the NT verb is added to the sequenced instructions for this chain at 818. If not, the cloud computing device 302 determines whether there are additional requests for processing at 820, and processing either continues at 802 with another request or finishes.

Figure 9:
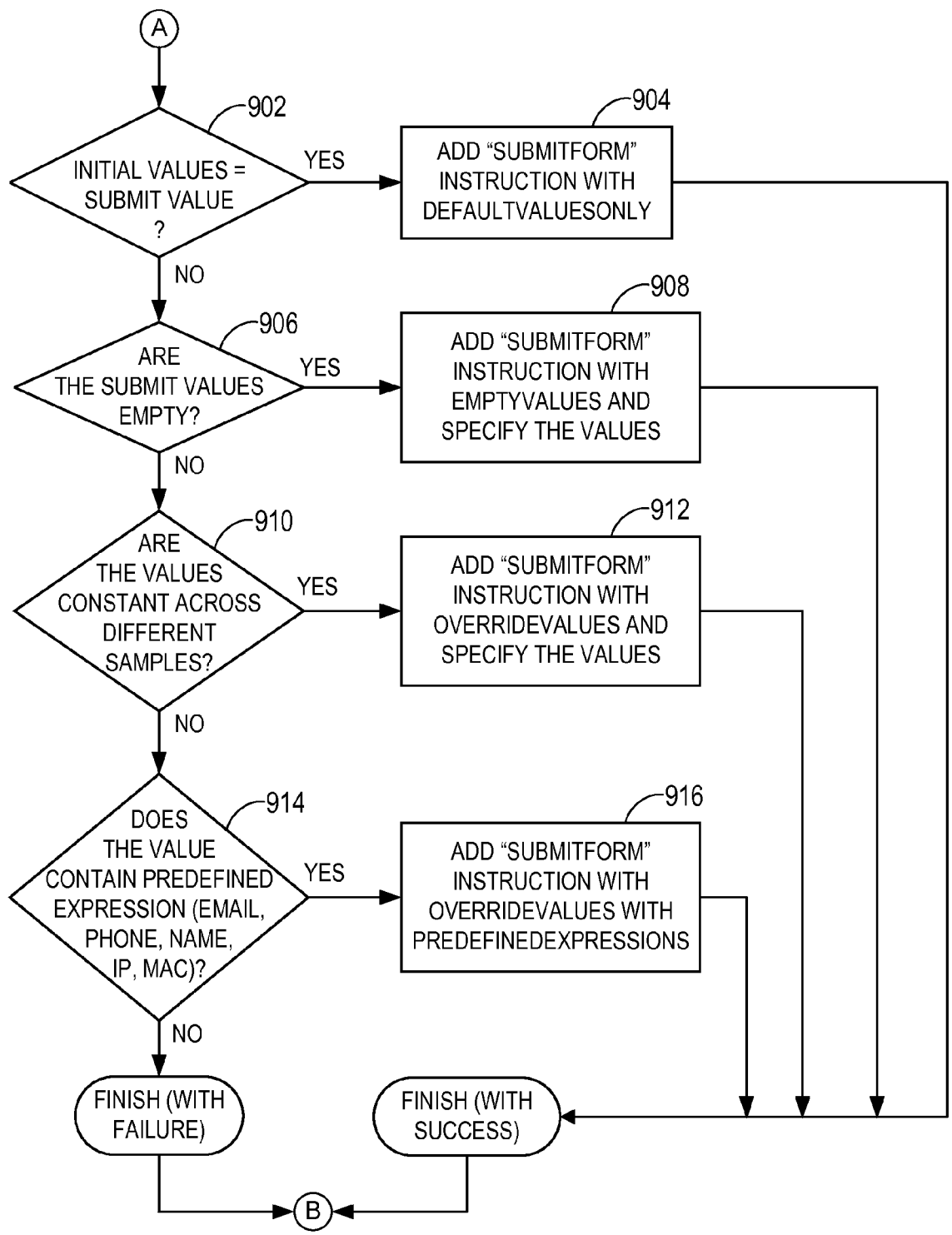
FIG. 9 is an exemplary flow chart illustrating operation of the cloud service to process interaction data from a form submission.

Referring next to FIG. 9, an exemplary flow chart illustrates operation of the cloud service 104 to process interaction data 206 from a form submission. The operations illustrated in FIG. 9 are described with reference to execution by the cloud computing device 302. However, aspects of the disclosure contemplate execution of the operations by other devices or processors, such as by one or more of the mobile computing devices 102.

An HTML form on a web page allows the user 106 to enter data that is sent to a server for processing. Forms are enclosed in the HTML form tag. This tag specifies the communication endpoint that the data entered into the form should be submitted to along with the method of submitting it (e.g., GET or POST operations). In some embodiments, forms include graphical UI elements (e.g., text input, checkbox, radio button, submit button, etc.).

The user 106 interacts with forms through named control. The "control name" of a control is given by the name attribute. Each control has both an initial value and a current value, both of which are character strings in some embodiments. In general, the "initial value" of the control may be specified with the value attribute of the control element. The "current value" of the control is first set to the initial value. Thereafter, the current value of the control may be modified through user interaction and scripts.

When the cloud computing device 302 detects a form submission such as described with reference to FIG. 8, the submitted values are compared to the initial values as next described with reference to FIG. 9.

At 902, the cloud computing device 302 determines whether the initial values equal the submit value. If so, the cloud computing device 302 adds the SF verb to the sequenced instructions at 904 with the command to apply default values. If not, the cloud computing device 302 determines whether the submit values are empty at 906. If so, the cloud computing device 302 adds the SF verb to the sequenced instructions at 908 with the command to apply empty values and specify the values during application of the sequenced instructions. If not, the cloud computing device 302 determines whether the values are constant across different samples at 910. If so, the cloud computing device 302 adds the SF verb to the sequenced instructions at 912 with the command to override values and specify the values during application of the sequenced instructions. If not, the cloud computing device 302 determines whether the value contains predefined expressions (e.g., email, telephone number, name, IP address, MAC address, etc.) at 914. If so, the cloud computing device 302 adds the SF verb to the sequenced instructions at 916 with the command to override values and replace the predefined expressions during application of the sequenced instructions. If not, the cloud computing device 302 finishes and notes that processing of the form submission was a failure.

Processing then continues in FIG. 8 with another request.

At least a portion of the functionality of the various elements in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "NFC" as used herein refers, in some embodiments, to a short-range high frequency wireless communication technology for the exchange of data over short distances.

Embodiments have been described with reference to data monitored and/or collected from the users 106. In some embodiments, notice may be provided to the users 106 of the collection of the data (e.g., via a dialog box or preference setting) and users 106 are given the opportunity to give or deny consent for the monitoring and/or collection. The consent may take the form of opt-in consent or opt-out consent.

In some embodiments, owners (e.g., venue owners) of the captive portals may opt-out from having interactions with their captive portals processed into sequenced instructions 308. In such embodiments, the owners send a request to the cloud computing device 302 to opt-out, and the cloud computing device 302 then does not collect and/or analyze the interaction data 206. In this manner, sequenced instruction 308 are not generated and distributed for the captive portals that have opted out.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. In some embodiments, computer storage media are implemented in hardware. Exemplary computer storage media include hard disks, flash drives, and other solid-state memory. In contrast, communication media embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user 106 in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for connecting to the network 108 through a captive portal based on data crowdsourced from the mobile computing devices 102. For example, one or more of the embodiments contemplate means for analyzing the manual portal assist data for the captive portal, enumerating a set of sequenced instructions 308 for the captive portal based on the analysis, and distributing the enumerated set of sequenced instructions 308 to a second set of the mobile computing devices 102. The second set of the mobile computing devices 102 applies the distributed set of sequenced instructions 308 when attempting to connect through the captive portal.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

An exemplary instruction set schema is next described. Each instruction set is identified by an instruction identifier (ID). To de-duplicate common instruction sets for Wi-Fi portal networks, a tile contains networks with associated instruction IDs. In some embodiments, a mapping table is included in the tile that contains the actual instruction sets with all the instruction IDs tagged to at least one of the networks.

Two exemplary instruction sets are shown in the example tile below, one with instruction ID 10000 and the other with instruction ID 10001.

```
{
    "Tiles": [{
        "Quadkey": "02123003022112122",
        "Version": 100,
        "NWLatitude": 0.0,
        "NWLongitude": 0.0,
        "SELatitude": 0.0,
        "SELongitude": 0.0,
        "ValidTo": "2013-06-20T02:46:57.325573Z",
        "Networks": [{
            "Type": 9,
            "Ssid": "ACT_OPEN_SSID#100",
            "Bssids": ["02-74-B6-7C-9A-D1","02-74-B6-7C-9A-D2","02-74-B6-7C-9A-D3","02-74-B6-7C-9A-D4","02-74-B6-7C-9A-D5","02-74-B6-7C-9A-D6","02-74-B6-7C-9A-D7","02-74-B6-7C-9A-D8","02-74-B6-7C-9A-D9","02-74-B6-7C-9A-D0"],
            "Score": 3.5,
            "DataCollectionNeeded": 0.5,
            "AutoConnectConfig": {
                "Security": 1,
                "Credentials": "Credentials",
                "WpaIds": [10000, 10001]
            },
            "MobileOperators": ["TestOperator1","TestOperator2"]
        },
        {
            "Type": 10,
            "Ssid": "ACT_OPEN_SSID#101",
            "Bssids": ["02-74-B6-7C-9A-D2","02-74-B6-7C-9A-D1"],
            "Score": 3.4,
            "DataCollectionNeeded": 0.6,
            "AutoConnectConfig": {
                "Security": 1,
                "Credentials": "Credentials",
                "WpaIds": [10000]
            },
            "MobileOperators": ["TestOperator1","TestOperator2"]
        }],
        "IsPartial": false,
        "WifiPortalAssistants": [{
            "Id": 10000,
            "Instruction": "WPA-10000XXXXXXXXXXXXXXXXXXXXXXXXXXXXX"
        },
        {
            "Id": 10001,
            "Instruction": "WPA-10001XXXXXXXXXXXXXXXXXXXXXXXXXXXXX"
        }]
    }],
    "UnservedIndexes": [ ]
}
```

Appendix B

An example of a telemetry event collected by the cloud service 104 from the mobile computing devices 102 is next described. The telemetry event indicates whether or not the connection attempt was successful. As shown in the example code below, after the connection attempt, the mobile computing device 102 sends the telemetry event containing, for example, the BSSID, SSID, device identifier, instruction identifiers, and a flag indicating success (e.g., "True") or failure (e.g., "False") of the connection attempt. If the connection was successful, the flag indicates success. If the connection failed yet the instructions 308 were replayed or executed properly, the flag indicates failure. If the mobile computing device 102 was unable to replay each of the instructions 308 properly, the flag indicates failure and the mobile computing device 102 updates the telemetry event to further identify which operation failed, the reason for the failure, and a session identifier.

```
/// <summary>
/// WiFi Portal Assist Telemetry Event
/// </summary>
public sealed class WFPATelemetry
{
    /// <summary>
    /// Bssid of the access point
    /// </summary>
    [DataMember(Name = "bssid")]
    public string Bssid { get; set; }
    /// <summary>
    /// Ssid of the access point
    /// </summary>
    [DataMember(Name = "ssid")]
    public string Ssid { get; set; }
    /// <summary>
    /// Device Id
    /// </summary>
    [DataMember(Name = "dvc")]
    public string DeviceId { get; set; }
    /// <summary>
    /// Instruction Id
    /// </summary>
    [DataMember(Name = "inid")]
    public int InstructionId { get; set; }
    /// <summary>
    /// Flag to indicate success
    /// </summary>
    [DataMember(Name = "succ")]
    public bool Success { get; set; }
    /// <summary>
    /// Zero based index to indicate the failed operation.
    /// </summary>
    [OptionalField]
    [DataMember(Name = "opid")]
    public int OperationIndex { get; set; }
    /// <summary>
    /// Failure reason code
    /// </summary>
    [OptionalField]
    [DataMember(Name = "reas")]
    public FailureReason reason { get; set; }
    /// <summary>
    /// WebSession
    /// </summary>
    [OptionalField]
    [DataMember(Name = "sess")]
    public IEnumerable<RequestResponsePairs> session
{ get; set; }
}
/// <summary>
/// The Response structure
/// </summary>
public class Response
{
    /// <summary>
    /// The response code i.e. 200, 302, 404 etc.
    /// </summary>
    [DataMember(Name = "stat")]
    public int Status { get; set; }
    /// <summary>
    /// The collection containing the header keyvalue pairs
    /// </summary>
    [DataMember(Name = "head")]
    public IEnumerable<Header> Headers { get; set; }
    /// <summary>
    /// The Content part of the response
    /// </summary>
    [DataMember(Name = "cont")]
    public string Content { get; set; }
}
/// <summary>
/// The Request structure
```

```
/// </summary>
public class Request
{
    /// <summary>
    /// The http Method being used i.e. GET, POST.
    /// </summary>
    [DataMember(Name = "meth")]
    public string Method { get; set; }
    /// <summary>
    /// The target URL
    /// </summary>
    [DataMember(Name = "url")]
    public string Url { get; set; }
    /// <summary>
    /// The Content part of the request
    /// </summary>
    [DataMember(Name = "cont")]
    public string Content { get; set; }
}
/// <summary>
/// Failure Reasons
/// </summary>
public enum FailureReason
{
    Unknown,
    Timeout,
    UnexpectedResponse,
    Disconnected
}
```

What is claimed is:

1. A system for producing a set of instructions for connecting to a network through a captive portal based on data crowdsourced from mobile computing devices, said system comprising:
    a memory area associated with a computing device, said memory area storing manual portal assist data received from a first set of mobile computing devices, the manual portal assist data describing actions performed by users when connecting to networks through captive portals with the first set of mobile computing devices; and
    a processor programmed to:
        for at least one of the captive portals, analyze the manual portal assist data stored in the memory area for the captive portal;
        construct one or more sign-on signatures for the at least one captive portal based on the analysis;
        enumerate a set of sequenced instructions for the captive portal based on the analysis and the one or more sign-on signatures; and
        distribute the enumerated set of sequenced instructions to a second set of the mobile computing devices, the second set of the mobile computing devices applying the distributed set of sequenced instructions when attempting to connect through the captive portal.

2. The system of claim 1, wherein the manual portal assist data comprises request and response data from a web browser or client.

3. The system of claim 1, wherein the processor is further programmed to identify a plurality of paths based on the constructed sign-on signatures, the plurality of paths representing different methods for connecting through the at least one captive portal.

4. The system of claim 3, wherein the plurality of paths comprises a free path and a paid path.

5. The system of claim 1, wherein the processor is programmed to analyze the manual portal assist data for at least one of the sign-on signatures.

6. The system of claim 1, wherein the processor is programmed to distribute the enumerated set of sequenced instructions via one or more geospatial tile data structures or network-specific queries.

7. The system of claim 1, wherein the sign-on signatures represent patterns where a user completed steps to connect through the at least one captive portal.

8. A method comprising:
receiving, by a first computing device from a plurality of second computing devices, data describing an interaction between the second computing devices and a network access point when establishing a connection to a network;
analyzing, by the first computing device, the received data from the plurality of second computing devices to identify a pattern in the received data;
based on the analyzing, identify a sequence of instructions for association with the network access point; and
distributing the sequence of instructions to one or more of the plurality of second computing devices, the one or more of the plurality of second computing devices applying the distributed sequence of instructions when attempting to connect to the network access point.

9. The method of claim 8, wherein the network access point provides network access within a geographic area, and wherein distributing the identified set of instructions comprises distributing the identified set of instructions only to one or more of the plurality of second computing devices located within the geographic area.

10. The method of claim 8, further comprising:
receiving location information from each of the plurality of second computing devices, and
selecting, based on the received location information, said one or more of the plurality of second computing devices to receive the identified set of instructions.

11. The method of claim 8, wherein receiving the data comprises receiving a history of request and response data from a browser executing on each of the plurality of second computing devices.

12. The method of claim 8, further comprising receiving, from said one or more of the plurality of second computing devices, data indicating whether connection to the network access point was successful.

13. The method of claim 8, wherein analyzing the received data comprises comparing the received data to pre-defined sets of actions to recognize the pattern.

14. The method of claim 8, wherein the manual portal assist data comprises request and response data from a web browser or client.

15. The method of claim 8, further comprising constructing one or more sign-on signatures for the network access point based on the analysis.

16. A method comprising:
receiving, by a first computing device from each of a plurality of second computing devices, data describing an interaction between the second computing device and a network access point when establishing a connection to a network;
analyzing, by the first computing device, the received data from the plurality of second computing devices to identify a set of instructions for association with the network access point;
distributing the identified set of instructions to one or more of the plurality of second computing devices, the one or more of the plurality of second computing devices applying the distributed set of instructions when attempting to connect to the network access point;
receiving, from said one or more of the plurality of second computing devices, data indicating whether connection to the network access point was successful; and
adjusting the identified set of instructions based on the received data.

17. The method of claim 16, further comprising distributing the adjusted set of instructions to said one or more of the plurality of second computing devices.

18. The method of claim 16, further comprising distributing the adjusted set of instructions to said one or more of the plurality of second computing devices without first receiving a request for the adjusted set of instructions from said one or more of the plurality of second computing devices.

19. The system of claim 1, wherein the processor is further programmed to receive a history of request and response data from a browser executing on the second set of the mobile computing devices.

20. The system of claim 1, wherein the processor is further programmed to receive, from the second set of the mobile computing devices, data indicating whether connection to the network access point was successful.

* * * * *